May 31, 1960 F. KELLNER 2,938,444
FOCUSING DEVICE FOR PHOTOGRAPHIC LENSES
Filed Sept. 22, 1955
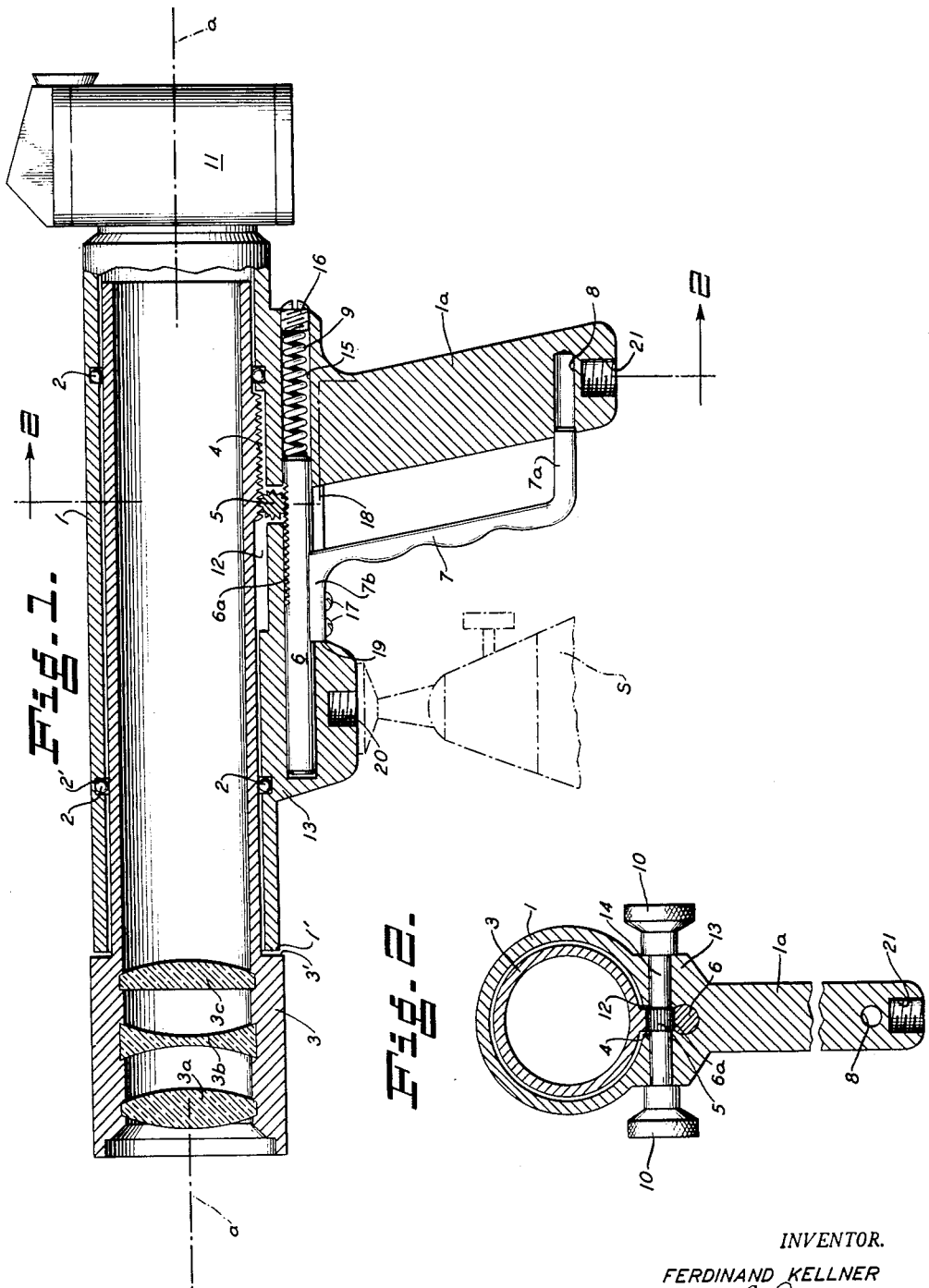
INVENTOR.
FERDINAND KELLNER
BY Walter S. Heston
ATTORNEY

United States Patent Office 2,938,444
Patented May 31, 1960

2,938,444

FOCUSING DEVICE FOR PHOTOGRAPHIC LENSES

Ferdinand Kellner, Hart, Bavaria, Germany, assignor to Novoflex Fotogeratebau Karl Muller, Memmingen, Bavaria, Germany, a firm Filed Sept. 22, 1955, Ser. No. 535,941

Claims priority, application Germany Dec. 8, 1954

2 Claims. (Cl. 95—45)

The invention relates to a focusing device for photographic lenses, especially for lenses of long focal length used with reflex cameras. With all conventional cameras great difficulties are encountered if it is desired to focus the taking lens fast and precisely, especially when the subject is moving. This is particularly true if long focus lenses are used owing to their shallow field of depth. Practically the majority of all pictures taken under such circumstances with lenses of long focal length are fuzzy because the conventional focusing means cannot meet the requirements of quick action photography.

The inadequacy of the conventional focusing means in quick action photography is due to the fact that in a helical mount, the type of means most commonly used for the purpose, and particularly in the heavy mount of a telephoto lens, the helix is hard to turn in the focusing operation, thus causing a shaking of the camera. In consequence, the ground glass image trembles and bounces and it becomes very difficult to seize the peak action moment and the sharp focus. Furthermore, the transition from unsharp to sharp focusing is gradual and very slow with such helix and, as a result, quick and precise focusing is a matter of chance. Fast focusing is still more difficult in cold weather when the viscosity of the grease of the helical mount is increased.

Other conventional means for focusing lenses comprise a rack and pinion drive. Both the helical mount and the rack and pinion drive of conventional design have another drawback. If a hand camera is used, one hand has to hold the camera while the other hand operates the release. This renders it impossible to focus the lens simultaneously. In consequence, there is a time interval between the focusing and the releasing of the shutter. If the subject, whose picture is to be taken, moves rapidly in or out of the distance for which the camera is set, even the shortest interval will be sufficient so that the subject gets out of focus.

Therefore, the invention aims to provide means for focusing photographic lenses whereby the hand holding or supporting the camera can simultaneously be used for focusing, so that the user's other hand is free to actuate the release at any moment.

Another object of the invention is the provision of a resilient means in combination with the adjustable part of the lens mount of a camera, and means for shifting the mentioned part against the restraint of the resilient means by a user's hand while the same hand holds the camera.

The invention further aims to provide a rack and pinion drive for a part of the lens mount which is adjustable between two end positions, in combination with a resilient means tending to urge the mentioned part into one of its end positions and another means for operating the mentioned drive by the hand holding the camera thereby to shift the adjustable mount part towards the other end position against the restraint of the resilient means.

The invention also aims to provide that part of the lens mount which normally is stationary with respect to the camera, with a grip like a pistol grip, and to provide means connected to the adjustable part of the lens mount and including a trigger-like member operative by the grip-holding hand to shift the adjustable mount part against the restraint of a resilient means tending to urge that part into a predetermined end position.

Further objects and details of the invention will be apparent from the description given hereinafter and the accompanying drawing illustrating an embodiment thereof by way of example.

In the drawing,

Fig. 1 is a longitudinal section of a lens mount with holding and adjusting means according to the invention, a camera being shown attached to the mount, Fig. 2 is a cross-section along line 2—2 in Fig. 1.

Referring now to the drawings, Figs. 1 and 2 show a tubular member 1 to the rear end of which a camera housing 11 is connected either integrally as in the illustrated example or releasably by any suitable and conventional means not shown. A tubular lens mount 3 is telescopically shiftable with respect to member 1 from which it projects with its front portion. In order to facilitate the movement of the mount 3, ball bearings 2 are provided in annular grooves 2' so that the balls of the bearings project slightly inward from the inner face of member 1. The mount 3 rides on these projecting balls. In its front portion, mount 3 carries the composite lens which has the optical axis $a$—$a$ and is shown as consisting of the three lens elements 3a, 3b and 3c. An inner end position of the mount 3 in relation to member 1 is defined e.g., by an outer shoulder 3' of mount 3 abutting against the front edge 1' of member 1. Means defining an outer end position of the mount 3 will be described hereinafter.

In order to hold the camera during the taking of pictures, a grip which in the preferred form is a pistol grip 1a, extends downward from member 1. Resilient means are provided for automatically urging the lens mount 3 into one of its end positions, and other means are provided, operative by the user's hand which holds the grip 1a, to shift the mount 3 practically momentarily against the restraint of the resilient means into any desired position between the two mentioned end positions. For this purpose, a rack 4 is secured to or integral with and extends lengthwise of the tubular mount 3 at the lower outside of the latter. Rack 4 can move in a longitudinal groove 12 on the inside of member 1, where this member is reinforced at 13 between the tubular portion thereof and the grip 1a, as clearly shown in Fig. 2. A transverse shaft 14 is journaled in the reinforced portion 13 and carries a pinion 5 which is in mesh with rack 4. Underneath pinion 5, the reinforced portion 13 is provided with a longitudinal blind bore 15 in which a rod 6, shorter than the bore, is lengthwise movable. On its upper side the rod 6 forms a rack 6a which is in mesh with pinion 5 opposite the aforementioned rack 4. At its rear end, bore 15 is closed by a screw 16 and a compression spring 9 is inserted between rod 6 and screw 16 so as to urge the rod into the position of Fig. 1 where the rod is close to the blind end of bore 15. An approximately Z-shaped member 7 is secured by screws 17 with its upper arm 7b to rod 6 so that the middle portion of the member 7 extends in front of the pistol grip 1a in the manner of a trigger. In order to render conjoint movement of the rod 6 and the trigger-like member 7 possible, a longitudinal slot 18 is provided in portion 13 underneath the bore 15, and a bore 8 directed parallel to axis $a$—$a$ is provided in grip 1a near its lower end so that the lower arm 7a of the trigger-like member 7 can engage therein. The shaft 14 of pinion 5 is provided with buttons 10 on both ends so as to render the focusing of the lens possible when the camera is mounted on a tripod S which may be affixed to one of the inner threads 20 and 21, whichever is more convenient. Of course, only one of the threads 20 and 21 may be provided if so desired.

Now it will be clear that a hand holding the grip 1a can simultaneously grasp the trigger-like member 7. When in so doing, the user's hand does not exercise a pressure on the trigger-like member 7, spring 9 urges and holds the parts in the position of Fig. 1, i.e. the inner end position of the movable lens mount 3, in which position the focus is set for "infinity." If, however, pressure is exerted on the trigger-like member so as to move it closer to the grip 1a, rod 6 will be taken along against the restraint of the spring 9 and its rack 6a will turn pinion 5 in a counter-clockwise direction in Fig. 1. The so rotating pinion will push the rack 4 and with it the movable lens mount 3 outward a distance depending on the amount of pressure exerted by the user's hand. It has been stated that the inner end position of the mount 3 is defined by shoulder 3' abutting against edge 1'. It is, of course, possible too to reach an inner end position by rod 6 bearing against the bottom end of bore 15 or the arm 7b abutting against the outer end 19 of slot 18. Similarly, the outward movement of mount 3 can be limited by rack 4 abutting against the front end of groove 12 or by the trigger-like member 7 abutting against the grip 1a.

It will be apparent to those skilled in the art that many alterations and modifications of the structure shown and described may be made without departure from the essence and spirit of the invention which for that reason shall not be limited but by the scope of the appended claims.

I claim:

1. A focusing device for a photographic lens system comprising a first member including a guiding and supporting portion adapted to be secured with its rear end to a camera, a second member guided and supported by said first member and adapted to receive said lens system in its front portion, said second member being shiftable in respect to said first member in the direction of the lens system axis, said first member including a first downward extension and being provided with a longitudinal bore parallel to said axis and located between said guiding and supporting portion and said downward extension and with a recess in said guiding and supporting portion communicating with said bore, an axially shiftable rod and a spring in said bore, said spring tending to urge said rod into an end position, said second member including a portion engaging in said recess of said first member, a driving means located substantially where said recess communicates with said bore and adapted to transmit movement of said rod to said recess-engaging portion of said second member, and a second downward extension of said rod forward of said first extension so as to form together with the latter a compressible pistol grip, whereby pressure of a user's fist encompassing both extensions will cause a focusing of said second member away from said end position and according to the amount of pressure exerted against the restraint of said spring.

2. A focusing device for a photographic lens system comprising a first tubular member adapted to be secured to a camera at its rear end, a second tubular member telescopically shiftable in respect to said first tubular member and adapted to receive said lens system in its front portion, said first tubular member including a downwardly extending pistol grip and being provided with a longitudinal bore closed at both ends and located between said second tubular member and said pistol grip, a rod and a spring in said bore, said spring tending to urge said rod into a forward end position, said second tubular member including a first rack on its lower portion on the side of said pistol grip, said rod including a second rack facing said first rack, a pinion journaled between said racks and being in engagement therewith and so positioned that it meshes simultaneously with the front portion of said first rack and the rear portion of said second rack, whereby said spring tends to focus said lens system for infinity, and a downward extension of said rod forward of said pistol grip and movable in relation thereto so that pressure of the user's fist encompassing said grip and extension will cause a projection of said second tubular member from infinity position.

References Cited in the file of this patent

UNITED STATES PATENTS

| | | |
|---|---|---|
| 308,468 | Clark | Nov. 25, 1884 |
| 1,103,418 | Johnson | July 14, 1914 |
| 1,748,379 | Azarraga | Feb. 25, 1930 |
| 2,667,321 | Pasturczak | Jan. 26, 1954 |

FOREIGN PATENTS

| | | |
|---|---|---|
| 469,710 | Germany | Dec. 19, 1928 |